United States Patent
Bigi et al.

(10) Patent No.: US 12,146,027 B2
(45) Date of Patent: Nov. 19, 2024

(54) PURIFICATION PROCESS FOR POLYETHER-CARBONATE POLYOLS

(71) Applicant: Dow Global Technologies LLC, Midland, MI (US)

(72) Inventors: Marinus A. Bigi, Pearland, TX (US); Nima Nikbin, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 628 days.

(21) Appl. No.: 17/424,259

(22) PCT Filed: Jan. 6, 2020

(86) PCT No.: PCT/US2020/012339
§ 371 (c)(1),
(2) Date: Jul. 20, 2021

(87) PCT Pub. No.: WO2020/159669
PCT Pub. Date: Aug. 6, 2020

(65) Prior Publication Data
US 2022/0089813 A1 Mar. 24, 2022

Related U.S. Application Data

(60) Provisional application No. 62/799,172, filed on Jan. 31, 2019.

(51) Int. Cl.
| | | |
|---|---|---|
| C08G 64/40 | (2006.01) | |
| B01J 20/18 | (2006.01) | |
| B01J 20/26 | (2006.01) | |
| C08G 64/02 | (2006.01) | |
| C08G 64/30 | (2006.01) | |
| C08G 64/34 | (2006.01) | |
| C08G 65/30 | (2006.01) | |

(52) U.S. Cl.
CPC ............ *C08G 64/406* (2013.01); *B01J 20/18* (2013.01); *B01J 20/267* (2013.01); *C08G 64/0208* (2013.01); *C08G 64/302* (2013.01); *C08G 64/34* (2013.01); *C08G 65/30* (2013.01)

(58) Field of Classification Search
None
See application file for complete search history.

(56) References Cited

U.S. PATENT DOCUMENTS

| | | | |
|---|---|---|---|
| 4,355,188 A | 10/1982 | Herold | |
| 4,528,364 A * | 7/1985 | Prier | ................. C07C 68/08 528/370 |
| 5,144,093 A | 9/1992 | Reisch | |
| 5,254,227 A | 10/1993 | Cawlfield | |
| 8,324,419 B2 | 12/2012 | Mijolovic | |
| 9,527,958 B2 | 12/2016 | Uthe | |
| 2015/0315337 A1 | 11/2015 | Uthe | |
| 2017/0152345 A1* | 6/2017 | Hofmann | ............... B01D 3/148 |
| 2022/0185956 A1* | 6/2022 | Kember | ............... C08G 64/406 |

FOREIGN PATENT DOCUMENTS

WO 2016/089039 A 6/2016

OTHER PUBLICATIONS

Tamburaci; Biosilica Incorporated 3D Porous Scaffolds for Bone Tissue Engineering Applications; Materials Science and Engineering C 91 (2018) pp. 274-291. (Year: 2018).*
Profiles of Drug Substances, Excipients and Related Methodology vol. 36 (2011) pp. 241-285. (Year: 2011).*
Ban; Zeolite Microporosity Studied by Molecular Simulation; HAL Open Science 35 (2009) pp. 1105-1115. (Year: 2009).*
Mumford; Comparison of Amberlite IRC-748 and Zeolite for Copper and Ammonium Ion Exchange, Journal of Chemical Engineering Data (2008) 3 pp. 2012-2017. (Year: 2008).*

* cited by examiner

*Primary Examiner* — David J Buttner

(57) ABSTRACT

Alkylene carbonates are removed from polyether-carbonate polymers by contacting the polyether-carbonate with an absorbent at a temperature of 30 to 150° C. The process is effective and inexpensive. The purified polyether-carbonate is useful for making polyurethanes as well as in many other applications.

5 Claims, No Drawings

PURIFICATION PROCESS FOR POLYETHER-CARBONATE POLYOLS

This invention relates to a purification process for polyether-carbonate polyols.

In some instances it becomes necessary to remove cyclic alkylene carbonate impurities from polyether-carbonate polyols.

Polyether-carbonate polyols can be made by copolymerizing carbon dioxide and an oxirane in the presence of a hydroxyl-functional starter and certain catalysts. This process produces a cyclic alkylene carbonate by-product that is soluble in the product. The presence of this alkylene carbonate in significant quantities is undesirable, and so processes have been developed to remove some or all of it. This is generally done by vaporizing the alkylene carbonate or stripping it from the polyol under reduced pressure, as described, for example, in U.S. Pat. No. 8,324,419 and US Published Patent Application No. 2017-0152345. Those processes are capital intensive and therefore expensive; moreover, they expose the polyether-carbonates to elevated temperatures at which thermal degradation can occur.

Ion exchange resins and various absorbents have been suggested for removing specific impurities from polyether polyols. U.S. Pat. No. 4,355,188, for example, describes a process in which double metal cyanide catalyst residues are treated with a strong base to convert the catalyst residues to ionic species, which then can be removed using an ion exchange resin. U.S. Pat. No. 5,144,093 describes a similar process, in which the catalyst residues are oxidized to form solids that can be removed by absorption and/or passing the polyol through an ion exchange resin bed. U.S. Pat. Nos. 4,985,551 and 5,254,227 describe methods for removing "strongly ionic" metallic impurities from a polyol by passing the polyol through an ion exchange medium while applying an electrical current across the ion exchange medium.

U.S. Pat. No. 8,354,559 describes removing double metal cyanide catalyst residues from a polyether by treatment with a finely particulate inorganic solid. U.S. Pat. No. 9,527,958 describes purifying polycarbonate polyols by treatment with diatomaceous earth to remove double metal cyanide catalyst residues. U.S. Pat. No. 9,815,965 describes removing catalyst residues from a polyether carbonate by performing an adsorption, agglomeration, coagulation and/or flocculation step to produce solid residues with are then separated. Adsorption is performed using activated clays, bleaching earths, synthetic silicates, activated carbon, activated silica or diatomaceous earth.

This invention is a process for removing a cyclic alkylene carbonate from a polyether-carbonate, comprising contacting a starting polyether-carbonate that contains at least 0.25 weight-%, based on the weight of the starting polyether-carbonate, of one or more cyclic alkylene carbonates, with a solid absorbent at a temperature of 30 to 150° C. and at which temperature the starting polyether-carbonate is a liquid.

The process effectively removes cyclic alkylene carbonates from polyether-carbonate polyols in an inexpensive and time-efficient manner, using simple equipment. The process requires only moderately elevated temperatures at which thermal degradation of the polyols is minimized.

The polyether-carbonate contains both ether and carbonate linkages. It is conveniently prepared by polymerizing one or more alkylene oxides together with a carbonate precursor, particularly carbon dioxide. The alkylene oxide may be, for example, ethylene oxide, 1,2-propylene oxide, 1,2-butane oxide, 2-methyl-1,2-butane oxide, 2,3-butane oxide, tetrahydrofuran, epichlorohydrin, hexane oxide, styrene oxide, cyclohexene oxide, or another polymerizable oxirane, or a mixture of any two or more thereof.

Various polyether-carbonate manufacturing processes have been described previously. The polyether-carbonate may be made, for example, in a process such as described in U.S. Pat. Nos. 6,762,278, 7,977,501 and 9,062,156, in which carbon dioxide and an oxirane are polymerized using a double metal cyanide catalyst complex such as a zinc hexacyanocobaltate complex. Alternatively, the polyether-carbonate can be polymerized in the presence of certain coordination catalysts as described in WO 2010/028362, WO 2010/071505 and WO 2012/071505 or in the presence of double metal coordination catalysts as described in U.S. Pat. No. 9,006,347, WO 2014/184578 and WO 2016/012786. The polyether-carbonate may be made in a semi-batch process in the presence of a double metal cyanide catalyst complex as described in WO 2018/089568.

The polyether-polycarbonate may have a carbonate content of, for example, at least 0.5 weight-%, at least 5 weight-%, at least 10 weight-%, at least 20 weight-% or at least 30 weight-%, based on the weight of the polymer. The carbonate content may be up to about 40 weight-%. Carbonate content is conveniently measured using an NMR method such as described in U.S. Pat. No. 9,062,156.

The polyether-carbonate may or may not have terminal hydroxyl groups. If the polyether-carbonate has terminal hydroxyl groups, it may have, for example, 1 to 8, 1 to 4, or 2 to 4 terminal hydroxyl groups. The polyether-carbonate may have a number average molecular weight (measured by gel permeation chromatography) of, for example, 250 to 12,000, 500 to 8,000, 1000 to 8,000, or 1000 to 6,000 g/mol. When the polyether-carbonate has hydroxyl groups, it may have a hydroxyl equivalent weight of at least 125, at least 250, at least 400, at least 500, at least 700 or at least 900 and up to 6,000, up to 3000, up to 2500 or up to 2000 grams/equivalent.

The polyether-carbonate is a liquid at the process temperature as described below and preferably also is a liquid at 22° C.

The cyclic alkylene carbonate is a compound (or mixture of two or more thereof), which in some embodiments has the structure:

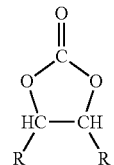

wherein each R is independently hydrogen, alkyl (such as $C_1$-$C_4$ alkyl) or halogen-substituted alkyl (preferably having 1-4 carbon atoms), with the proviso that the two R groups may together form a divalent group that forms a ring that includes the carbon atoms to which the R groups are bonded in the foregoing structure. The alkylene carbonate in some embodiments is ethylene carbonate, propylene carbonate or a mixture thereof.

The polyether-carbonate may contain, for example, 0.25 to 25% by weight of the alkylene carbonate, based on the combined weight of polyether-carbonate and alkylene carbonate. In specific embodiments this amount may be at least 0.5%, at least 1% or at least 2% and may be up to 15%, up to 10%, up to 7.5% or up to 5%. The alkylene carbonate may be an impurity formed in the production of the polyether-carbonate. For example, alkylene carbonate by-products often form when carbon dioxide is copolymerized with an alkylene oxide such as ethylene oxide or propylene oxide (to form ethylene carbonate or propylene carbonate, respectively).

Examples of useful solid (under the conditions of the contacting step) absorbents include alumina, magnesium silicate, molecular sieves (including various aluminosilicate materials such as natural and synthetic zeolites), silica gel, various clays (such as kaolin, montmorillonite, and bentonite), and organic polymers, particularly crosslinked porous polymers. Such absorbents are conveniently used in the form of a particulate solid.

The absorbent preferably is a porous material. A porous absorbent may have pores having an average pore size of, for example, at least 1 nm, at least 2 nm, at least 5 nm, at least 10 nm, or at least 20 nm, up to 200 nm, up to 100 nm, up to 50 nm or up to 30 nm, as measured using gas absorption methods. The pore volume of a porous absorbent may be, for example, 0.25 to 2 mL/g. A porous absorbent may have a nitrogen BET surface area of, for example, 10 to 1250 $m^2/g$.

The absorbent is stable at the process temperature, by which is meant it does not degrade or decompose, nor does it undergo a phase transition (such as melting or transition from a glassy to rubbery state) upon heating from 20° C. to the process temperature. When the absorbent is porous, the absorbent retains its porous structure at the process temperature.

Particularly useful absorbents include crosslinked polymer beads including styrene-divinylbenzene copolymer beads, crosslinked polyolefins, or crosslinked acrylic monomer beads. The polymer beads may be, for example, lightly crosslinked "gel" type resin beads as described in U.S. Pat. Nos. 4,419,245, 4,564,644 and 5,231,115, so-called "mesoporous" polymer beads that may have an average pore size of about 2 nm to 50 nm, or highly crosslinked "macroporous" resin beads as described, for example, in U.S. Pat. Nos. 4,221,871, 4,224,415, 4,256,840, 4,501,826 and 6,323,249 and US Published Patent Application No. 2005-0261384. The macroporous resin beads may have an average pore size of, for example, 20 nm to 200 nm. The polymer beads may be unfunctionalized and so lack ion exchange capacity. They may have particle diameters within the range of, for example, of 0.05 to 2.5 mm, especially 250 to 1250 µm. Suitable polymer bead absorbents are sold by DuPont de Nemours, Inc. (DuPont, Wilmington, Delaware US) under the Amberlyst™ and Dowex™ trade names.

In especially preferred embodiments, the absorbent is one or more ion exchange resins or ion exchange membranes. Ion exchange resins include crosslinked polymer beads as described in the preceding paragraph, which are functionalized with acid or basic functional groups which provide cation and anion exchange capacity, respectively. Useful cation exchange resins include the so-called strong acid types that include strong acid functional groups such as sulfonic acid or phosphonic acid groups, which are generally associated (before use) with a counterion (a cation) such as hydrogen, sodium or potassium. Other useful cation exchange resins are so-called weak acid resins that contain weak acid functional groups such as carboxylic acid groups, which again may be associated before use with a counterion. Useful anion exchange resins include the so-called strong base and weak base types. The functional groups of strong base types are typically quaternary ammonium or quaternary phosphonium groups, (associated with a counter anion such as hydroxide or halide), whereas the functional groups of weak base types are typically unquaternized primary, secondary or tertiary amino or phosphine groups. The ion exchange resin may be a gel type but is preferably porous as described before. Mesoporous and/or macroporous types are therefore preferred. The ion exchange resin may have an ion exchange capacity of, for example 0.5 to 5 eq/L. Examples of useful commercially available ion exchange resins include those sold by Dow-DuPont under the Amberlyst™, Amberlite™ and Dowex™ trade names, as well as those sold by Purolite Americas under the Purolite® trade name.

In addition, chelating resins are crosslinked polymer beads that have, for example, aminophosphonic, amidoxime, aminodiacetic, bis-picolylamine, thiourea or isothiouronium functional groups. These may have particle sizes and ion exchange capacities as described above with regard to the ion exchange resins, and may have porosities as described before. Suitable products are sold under the Amberlite™, Dowex™ and Purolite™ trade names.

Ion exchange membranes are polymer films functionalized with one or more strong acid, weak acid, strong base, weak base and/or chelating groups as described above. These may have ion exchange capacities similar to those described above with regard to the ion exchange resins, and porosities as described before.

Among the useful molecular sieves are various aluminosilicate materials that have average pore sizes of 2 nm or greater, such as those commonly designated as 3A molecular sieves (having an approximate chemical formula: $2/3K_2O \cdot 1/3Na_2O \cdot Al_2O_3 \cdot 2 SiO_2 \cdot 9/2 H_2O$); 4A molecular sieves (having an approximate chemical formula $Na_2O \cdot Al_2O_3 \cdot 2SiO_2 \cdot 9/2H_2O$; molecular sieves 5A having an approximate chemical formula: $0.7CaO \cdot 0.30Na_2O \cdot Al_2O_3 \cdot 2.0SiO_2 \cdot 4.5H_2O$); 5A molecular sieves (calcium aluminosilicate with an effective pore diameter of 0.5 nm); 10X molecular sieves (having an approximate chemical formula $4/5CaO \cdot 1/5Na_2O \cdot Al_2O_3 \cdot (2.8 \pm 0.2) SiO_2 \cdot (6-7)H_2O$), 13X molecular sieves having an approximate chemical formula)$Na_{86}[(AlO_2)_{86}(SiO_2)_{106}] \cdot nH_2O$ where n is a positive number); 13X-AS molecular sieves, and Cu-13X molecular sieves.

Alkylene carbonates are removed from the polyether-carbonate by contacting the polyether-carbonate containing the alkylene carbonate(s) with the solid absorbent at a temperature of 30 to 150° C. The temperature may be at least 45° C., at least 50° C. or at least 60° C., and is preferably no greater than 100° C., no greater than 90° C. or no greater than 85° C. An especially preferred temperature is 60 to 85° C. At these temperatures, alkylene carbonates are removed effectively within reasonable contacting times and with minimal if any degradation of the polyether-carbonate and absorbent. Within the foregoing ranges, the temperature is selected such that the polyether carbonate is a liquid.

The contacting is preferably performed with mixing by, for example, agitating a mixture of the absorbent with the polyether-carbonate and/or by flowing the polyether-carbonate past and in contact with the absorbent. A bed of absorbent may be provided and the polyether-carbonate may be flowed through the bed one or more times to establish contact with the absorbent. Alternatively, the absorbent may be dispersed into the polyether-carbonate and the dispersion agitated mechanically (by stirring or shaking, for example, or passing the dispersion through a static mixture), ultrasonically or otherwise.

The amount of absorbent may be at least 1%, at least 2.5% or at least 4% by weight, based on the weight of the starting mixture of cyclic alkylene carbonate and polyether-carbonate. Any greater amount can be used, but it is generally advantageous that the amount of absorbent is no more than 100%, no more than 50%, no more than 25%, no more than 15% or no more than 12%, on the foregoing basis. In particular embodiments the amount of absorbent is 4 to 12% on the foregoing basis. Larger amounts of absorbent generally remove larger quantities of alkylene carbonate per unit time, at equivalent operating temperature.

The contacting step may be performed under an inert atmosphere such as nitrogen, helium or argon, to prevent oxidation of the polyether-carbonate.

The time for which the absorbent and polyether-carbonate are contacted may be, for example, from 15 minutes to 72 hours. In general, greater amounts of alkylene carbonate are removed with greater contact times. In some embodiments, the contact time is at least one hour, at least 2 hours or at least 4 hours and up to 48 hours or up to 24 hours.

The contacting time is generally selected within the foregoing ranges to achieve a desired reduction in alkylene carbonates in the polyether-carbonate. It is generally preferable to remove at least 10%, at least 20%, at least 30% or at least 40% of the alkylene carbonates by weight. As much as 100% of the alkylene carbonates can be removed, although in specific embodiments up to 90%, up to 85% or up to 80% thereof are removed.

The polyether-carbonate obtained in the foregoing process is useful in the same manner and for in the same applications as the untreated polyether-carbonate. It is useful as or as a component of a thermal fluid, brake or other hydraulic fluid, and as a raw material for making a variety of thermoplastic and thermosetting polymers, particularly polyurethanes which can be formed by reacting a hydroxyl-containing polyether-carbonate with a polyisocyanate. Among the polyurethane products that can be prepared using a polyether-carbonate obtained in the foregoing process are slabstock foams, molded foams, flexible foams, viscoelastic foams, combustion modified foams, rigid foams, elastomers, adhesives, sealants, and/or coatings. The polyurethane products may be useful in a variety of packaging applications, comfort applications (such as mattresses, mattress toppers, pillows, furniture, seat cushions, etc.), shock absorber applications (such as bumper pads, sport and medical equipment, helmet liners, etc.), thermal insulation applications, anti-static packaging of electronic goods, and noise and/or vibration dampening applications (such as earplugs, automobile panels, etc.), as well as many others.

The following examples are provided to illustrate the invention but are not intended to limit the scope thereof. All parts and percentages are by weight unless otherwise indicated.

EXAMPLES 1-2

The polyether-carbonate used in these and the following examples is a nominally 3500 number average molecular weight triol made by polymerizing a feed composition containing 2.63 wt % glycerin, 11.00 wt % ethylene oxide, 2.90 wt % carbon dioxide and 83.47 wt % propylene oxide. It contains mostly secondary hydroxyl groups, and contains residual propylene carbonate and ethylene carbonate.

For Example 1, a sample of the polyether-carbonate is introduced into a 20 mL scintillation vial at ambient temperature. 0.1 g of the mixture is removed, dissolved in 0.5 g of methanol and analyzed by gas chromatography to ascertain the starting alkylene carbonate concentration through comparison with a calibration curve generated using standards of known concentrations of propylene carbonate in a polyether polyol. The starting alkylene carbonate concentration is about 3.5% by weight.

0.25 g of strong acid-type, macroporous styrene-divinylbenzene copolymer ion exchange resin beads having sulfonic acid groups in the acid form and an average pore size of 22 nm (Amberlyst 70, from DuPont) are added and the resulting slurry is stirred at 50° C. for 48 hours. Samples of the supernatant polyether-carbonate are taken at 4, 24 and 48 hours and analyzed as above for alkylene carbonate concentration.

Example 2 is performed using the same general method, except the temperature is 70° C. throughout. The amounts of absorbent and starting polyether-carbonate/alkylene carbonate mixture and the results obtained are as indicated in Table 1.

TABLE 1

Removal of Alkylene Carbonate with Strong Acid Ion Exchange Resin

| Ex. | Starting polyether, g | Absorbent, g | Temp, ° C. | Alkylene Carbonate Concentration, Wt-% | | | |
|---|---|---|---|---|---|---|---|
| | | | | 0 hr | 4 hr | 24 hr | 48 hr |
| 1 | 9 | 0.4 | 50 | 2.17 | 1.91 | 1.69 | 1.51 |
| 2 | 11 | 0.5 | 70 | 1.95 | 1.63 | 0.91 | 0.50 |

The strong acid ion exchange resin is an effective absorbent at all temperatures tested. However, better performance is seen at higher temperature, i.e., at 70° C., as is seen by comparing the results of Example 1 with those of Example 2.

EXAMPLES 3-6

Examples 3 and 4 are performed by repeating Examples 1 and 2, replacing the strong acid ion exchange resin with Molecular Sieve 13X, a synthetic zeolite in the sodium form. This material has an approximate empirical formula of $Na_{86}[(AlO_2)_{86}(SiO_2)_{106}] \cdot nH_2O$ (n being variable), a nominal pore size of approximately 10 Angstroms, and is provided in the form of 1.4 mm diameter pellets. Results are as indicated in Table 2.

TABLE 2

Removal of Alkylene Carbonate with Molecular Sieve 13X

| Ex. | Starting polyether, g | Absorbent, g | Temp, ° C. | Alkylene Carbonate Concentration, Wt-% | | | |
|---|---|---|---|---|---|---|---|
| | | | | 0 hr | 4 hr | 24 hr | 48 hr |
| 3 | 11 | 0.6 | 50 | 2.17 | 1.89 | 1.53 | 1.42 |
| 4 | 10.1 | 0.5 | 70 | 1.95 | 1.60 | 1.11 | 0.92 |

This synthetic zeolite absorbent is also effective, again with better performance being seen at the higher temperature.

The effect of concentration of this absorbent is evaluated by repeating Example 4 using two different levels of absorbent, as set forth in Table 3.

TABLE 3

Removal of Alkylene Carbonate with Varying Amounts of Molecular Sieve 13X

| Ex. | Starting polyether, g | Absorbent, g | Temp, °C. | Alkylene Carbonate Concentration, Wt-% | | | |
|---|---|---|---|---|---|---|---|
| | | | | 0 hr | 4 hr | 24 hr | 48 hr |
| 5 | 10.7 | 0.5 | 70 | 2.07 | 1.66 | 1.24 | 1.08 |
| 6 | 9.7 | 1.2 | 70 | 2.07 | 1.05 | 0.56 | 0.41 |

These results show that more rapid alkylene carbonate removal is obtained using a higher concentration of absorbent.

EXAMPLES 7 AND 8

Examples 1 and 2 are again repeated, replacing the strong acid ion exchange resin with a weak base ion exchange resin. The weak base resin is a macroporous styrene-divinylbenzene copolymer functionalized with tertiary amino groups in the free base form, and is commercially available from DuPont as Amberlite™ IRA96 resin. Results are as indicated in Table 4.

TABLE 4

Removal of Alkylene Carbonate with Weak Base Ion Exchange Resin

| Ex. | Starting polyether, g | Absorbent, g | Temp, °C. | Alkylene Carbonate Concentration, Wt-% | | | |
|---|---|---|---|---|---|---|---|
| | | | | 0 hr | 4 hr | 24 hr | 48 hr |
| 7 | 11 | 0.5 | 50 | 2.17 | 1.91 | 1.79 | 1.68 |
| 8 | 9.9 | 0.5 | 70 | 1.95 | 1.78 | 1.33 | 0.95 |

Similar results are seen as before, with better performance being seen at the higher temperature.

EXAMPLES 9 AND 10

Examples 1 and 2 are again repeated, replacing the strong acid ion exchange resin with a weak acid ion exchange resin. The weak base resin is a macroporous, crosslinked methacrylic acid copolymer containing carboxylic acid groups in the acid form, and is commercially available from DuPont as Amberlite™ CG50 resin. Results are as indicated in Table 5.

TABLE 5

Removal of Alkylene Carbonate with Weak Acid Ion Exchange Resin

| Ex. | Starting polyether, g | Absorbent, g | Temp, °C. | Alkylene Carbonate Concentration, Wt-% | | | |
|---|---|---|---|---|---|---|---|
| | | | | 0 hr | 4 hr | 24 hr | 48 hr |
| 9 | 11.2 | 0.6 | 50 | 2.17 | 2.09 | 1.87 | 1.75 |
| 10 | 9.6 | 0.5 | 70 | 1.95 | 1.85 | 1.54 | 1.29 |

Similar results are seen as before, with better performance being seen once again at the higher temperature.

EXAMPLES 11 AND 12

Example 2 is repeated twice more, replacing the strong acid ion exchange resin with unfunctionalized macroporous styrene-divinylbenzene copolymer beads. This product has a nominal particle size of 1 mm, has a 34 Angstrom mean pore size, a pore volume of 0.94 mL/g and a surface area of 1100 m²/g. It is commercially available from DuPont as Optipore™ V-503 resin. Results are as indicated in Table 6.

TABLE 6

Removal of Alkylene Carbonate with Macroporous Copolymer Beads

| Ex. | Starting polyether, g | Absorbent, g | Temp, °C. | Alkylene Carbonate Concentration, Wt-% | | | |
|---|---|---|---|---|---|---|---|
| | | | | 0 hr | 5 hr | 24 hr | 48 hr |
| 11 | 9.8 | 0.5 | 70 | 2.28 | 1.96 | 1.71 | 1.43 |
| 12 | 10.1 | 1.0 | 70 | 2.28 | 1.81 | 1.54 | 1.33 |

The macroporous copolymer beads are also effective in removing alkylene carbonate from the polyether.

What is claimed is:

1. A process for removing an alkylene carbonate from a polyether-carbonate, comprising contacting a starting polyether-carbonate that contains at least 0.25 weight-%, based on the weight of the starting polyether carbonate, of one or more alkylene carbonates, with a solid absorbent that contains pores having an average pore size of at least 1 nm up to 100 nm at a temperature of 30 to 150° C. and at which temperature the starting polyether-carbonate is a liquid, wherein the solid absorbent has a pore volume of 0.25 to 2 mL/g and is selected from the group consisting of an unfunctionalized, crosslinked porous polymer that lacks ion exchange capacity in the form of a particulate solid and a crosslinked porous polymer which which crosslinking porous polymer is is a crosslinked porous anion exchange resin in the form of a particulate solid.

2. The process of claim 1 wherein the starting polyether-carbonate contains 0.5 to 15% by weight of the alkylene carbonate, based on the combined weight of polyether carbonate and alkylene carbonate.

3. The process of claim 1 wherein the alkylene carbonate includes propylene carbonate, ethylene carbonate or both propylene carbonate and ethylene carbonate.

4. The process of claim 1 wherein 40 to 100 weight % of the alkylene carbonate is removed.

5. The process of claim 1 wherein the temperature is 60 to 85° C.

* * * * *